United States Patent
Bauer

(10) Patent No.: US 9,910,995 B2
(45) Date of Patent: Mar. 6, 2018

(54) SYSTEM AND METHOD FOR SECURE FILE TRANSMISSION

(71) Applicant: TRUMPF Werkzeugmaschinen GmbH + Co. KG, Ditzingen (DE)

(72) Inventor: Klaus Bauer, Ditzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 228 days.

(21) Appl. No.: 14/057,444

(22) Filed: Oct. 18, 2013

(65) Prior Publication Data

US 2014/0053275 A1    Feb. 20, 2014

Related U.S. Application Data

(63) Continuation of application No. PCT/EP2012/057224, filed on Apr. 19, 2012.

(30) Foreign Application Priority Data

Apr. 20, 2011    (DE) .................. 10 2011 007 761

(51) Int. Cl.
*G06F 21/60* (2013.01)
*H04L 29/08* (2006.01)
*G05B 19/042* (2006.01)

(52) U.S. Cl.
CPC ......... *G06F 21/606* (2013.01); *G05B 19/042* (2013.01); *H04L 67/06* (2013.01);
(Continued)

(58) Field of Classification Search
CPC ........... G06F 21/606; G06F 2213/0038; H04L 67/06; H04L 67/125; G05B 19/042; G05B 2219/23298
(Continued)

(56) References Cited

U.S. PATENT DOCUMENTS 6,438,642 B1 *  8/2002  Shaath .................. G06F 3/0607
                                                    711/100
7,761,551 B2    7/2010  Thieringer
(Continued)

FOREIGN PATENT DOCUMENTS

DE    102007030396 A1    1/2009
EP         1715395 A1   10/2006

OTHER PUBLICATIONS

International Preliminary Report on Patentability from corresponding PCT Application No. PCT/EP2012/057224, dated Oct. 22, 2013, 9 pages.
(Continued)

*Primary Examiner* — Arvin Eskandarnia
*Assistant Examiner* — Javier O Guzman
(74) *Attorney, Agent, or Firm* — Fish & Richardson P.C.

(57) ABSTRACT

Methods, systems, and apparatus, including computer programs encoded on a computer storage medium, for file transmission. In one aspect, a system includes at least one machine control system, having access to a first data storage; at least one service computer, having access to a second data storage; and a central computer having at least one virtual machine. The machine control system is connectable to the virtual machine via a first communication connection in a manner that files between the first data storage and a data storage, to which the virtual machine has access, are transmissible. The service computer is connectable to the virtual machine via a second communication connection, in a manner that the virtual machine can access the second data storage and can store there files of a transmission via the first communication connection or can read files for a transmission via the first communication connection.

20 Claims, 3 Drawing Sheets

(52) U.S. Cl.
CPC ............ *H04L 67/12* (2013.01); *H04L 67/125* (2013.01); *G05B 2219/23298* (2013.01); *G06F 2213/0038* (2013.01)

(58) Field of Classification Search
USPC ........................................................ 709/227
See application file for complete search history.

(56) References Cited

U.S. PATENT DOCUMENTS

| | | | | |
|---|---|---|---|---|
| 2004/0070608 | A1* | 4/2004 | Saka | H04L 29/06 715/748 |
| 2004/0230970 | A1* | 11/2004 | Janzen | G06F 9/45537 717/174 |
| 2006/0182045 | A1* | 8/2006 | Anderson | H04L 67/04 370/260 |
| 2006/0184784 | A1* | 8/2006 | Shani | G06F 21/606 713/150 |
| 2007/0157203 | A1* | 7/2007 | Lim | G06F 9/468 718/100 |
| 2008/0034419 | A1* | 2/2008 | Mullick | H04L 63/0272 726/15 |
| 2008/0091794 | A1* | 4/2008 | Thieringer | G05B 19/042 709/217 |
| 2008/0125067 | A1* | 5/2008 | Bells | H04W 4/00 455/187.1 |
| 2008/0201479 | A1* | 8/2008 | Husain | H04L 67/34 709/227 |
| 2009/0007255 | A1 | 1/2009 | Grzonka | |
| 2010/0154051 | A1 | 6/2010 | Bauer | |
| 2011/0314470 | A1* | 12/2011 | Elyashev | G06F 11/1484 718/1 |
| 2014/0280810 | A1* | 9/2014 | Gabrielson | H04L 41/0806 709/222 |
| 2015/0363478 | A1* | 12/2015 | Haynes | G06F 17/30575 707/625 |

OTHER PUBLICATIONS

Madden, Brian, "Citrix MetaFrame XP: Advanced Technical Design Guide Including Feature Release 2", 2 Ed., BrianMadden. com Publishing, Washington DC, 2002, Ch. 1 and 10; (English).

* cited by examiner

SYSTEM AND METHOD FOR SECURE FILE TRANSMISSION

CROSS REFERENCE TO RELATED APPLICATIONS

This application is a continuation of and claims priority under 35 U.S.C. § 120 to PCT Application No. PCT/EP2012/057224 filed Apr. 19, 2012, which claimed priority to German Application No. 10 2011 007 761.8, filed Apr. 20, 2011. The contents of both of these priority applications are hereby incorporated by reference in their entirety.

TECHNICAL FIELD

The invention relates to a system and a method for file transmission between a service computer and a machine control system. The invention relates in particular to a system and a method for file transmission between a service computer and a machine control system, allowing a secure file transmission.

BACKGROUND

The global orientation of today's machine manufacturers having globally residing customers/machine operators raises the need to perform maintenance, error diagnosis and also repair of the machine not only directly on site, but increasingly often via remote access. In this application, the term "machines" includes all machining devices, e.g. for laser machining, for punching or bending, and devices like e.g. laser beam sources, plasma generators or induction generators. The hitherto common direct call of a service computer via an analogue modem or an ISDN connection to a machine is replaced by modern communication techniques, in particular by so-called Virtual Private Networks (abbreviated VPN), allowing an encrypted remote access via the internet. Remote access using VPN has high demands on infrastructure and security. Particularly problematic is the fact that remote access via VPN is dependent on the technology employed by the machine operator. A simple all purpose solution at the machine operator's side is handicapped by the fact that it is hitherto not possible to operate different VPN-software at the same time within one operating system, e.g. at a service computer.

A system and method for remote communication between a central computer and a machine control system are known from the European patent application EP 1 715 395 A1. The known remote communication system 1 shown in FIG. 1 includes a central computer 5 that is protected to the exterior by a firewall 6. At the central computer 5, plural virtual machines 7 are installed that are coexistingly executable and may comprise different operating systems and application programs, in particular tele presence programs and virus protection programs. For each machine control system 3, there is a specifically configured virtual machine 7, by that a communication connection 8 is established from the central computer 5 to the machine control system 3. The service computer 2 is not directly connected with the machine control system 3, but the connection of the service computer 2 is carried out via the central computer 5 that is connected to the service computer 2 via a communication connection 9. All data (dial-in technology, passwords, VPN-software) about the customer and the machine 4 are stored in a database 10 that is connected to the central computer 5. Central computer 5 determines the assigned communication connection 8 as well as the correlated virtual machine 7 by means of the data stored in the database 10, and establishes the communication connection 8 from the virtual machine 7 to the machine control system 3. A communication connection 9 between the service computer 2 and the central computer 5 as well as the communication connection 8 between the central computer 5 and the machine control system 3 are carried out via the internet 11, e.g. via a secured VPN connection.

For remote access to a machine control system 3 of the machine 4, service personnel at first establishes the communication connection 9 between its service computer 2 and the central computer 5. By means of the data stored in the data base 10, the central computer 5 determines the communication connection 8 correlated to the communication control system 3 and selects the executable virtual machine 7 fitted for the machine control system 3 and the communication connection 8 for connecting the machine control system 3 and starts this virtual machine 7. The service personnel executes functions of the machine control system 3 or exchanges data between the machine control system 3 and the central computer 5 via the communication connection 8.

This system is problematic in so far that for specific tasks of the machine maintenance and repair, files have to be transmitted from the machine control system 3. The described system, however, is designed such that file transmission between the machine control system and the service computer is not possible.

SUMMARY

An object of the present invention consists in providing a system and a method by which files can be transmitted between a data storage of the service computer and the data storage of at least one machine tool, wherein it is avoided that both systems mutually endanger each other.

This object is solved by the features of the system according to claim 1 and the method steps of the method according to claim 11. Advantageous embodiments are subject-matter of the sub-claims.

Disclosed is a system for file transmission between a service computer and a machine control system, comprising at least a machine control system, at least a service computer and at least a central computer. The machine control system has access to a first data storage, capable of readably storing files. The service computer has access to a second data storage capable of readably storing files. The central computer comprises at least one virtual machine. The machine control system is connected with the virtual machine via a first communication connection in a manner such that files are transmissible between the first data storage and a data storage accessible by the virtual machine. The service computer is connectable with the virtual machine via a second communication connection in a manner such that the virtual machine may access the second data storage and may store the file of a first transmission via the first communication connection or may read the file for a transmission via the first communication connection.

By those features, there is established an environment, in which the machine control system and the communication networks thereof are physically separated from the service computer and its communication networks. A direct connection for file transmission between the machine control system and the service computer is therefore not necessary.

If a transmission of files between the first data storage and the second data storage is not possible, by that, specific security hazards for the machine control system or the service computer may be eliminated.

If the first and the second data storage are storages for permanent storage of files and are not only parts of the machine control system or the service computer, but also accessible from those via a communication network, the possible amount of transmissible files is enlarged.

If the first communication connection or the second communication connection is configured such that they are carried out via the internet, in particular via a VPN connection, a cheap network without direct call may be used for file transmission and nevertheless the security of the transmission may be ensured.

If the second communication is carried out by means of the Remote Desktop Protocol, in particular by means of Windows terminal services, in a manner, in that input/output operations to the second data storage are redirected such that it is usable like a local data storage in the virtual machine, the secure file transmission is possible by means of standard tools in a manner providing a familiar working surrounding to the user by transparency of the system, and eliminates the need for training and familiarization.

If the first communication connection is established via an at least one application program comprised by the virtual machine, simple file transmission is possible.

If the second communication connection transmits pixel information, mouse movement and keyboard movement, the application program of the virtual machine may be operated.

If the central computer comprises a further virtual machine besides the at least one virtual machine, wherein the virtual machines are set-up for different kinds of the first communication connection, in particular comprise different operating systems or different application programs or different virus protection programs, the system is adaptable to different machine control systems and connections.

If the central computer comprises plural virtual machine templates that are designed for different kinds of machine control systems or first communication connections, and if each virtual machine of the central computer is an executably embedded copy of that virtual machine template adapted to the corresponding machine control system or the corresponding first communication connection, on the one hand, there can be saved storage capacity on the central computer and, on the other hand, a threat by a possible compromised virtual machine can be eliminated by their deletion.

Disclosed is further a method for file transmission between a service computer and a machine control system, comprising the following steps: establishing a first communication connection between the machine control system having a first data storage and a virtual machine provided at a central computer, establishing a second communication connection between a virtual machine and the service computer having access to a second data storage, wherein the second communication connection is configured such that the virtual machine can access the second data storage and store or read files there, and reading of a file from the first or second data storages, transmission of the file via the first data communication connection, and storing the file on the other one of first and second data storage.

Further advantages and advantageous embodiments of the subject-matter of the invention can be taken from the description, the drawings and the claims. Likewise, the features named before and in the following may be used according to the invention each individually or together in arbitrary combinations. Other features, objects, and advantages of the invention will be apparent from the description and drawings, and from the claims.

DETAILED DESCRIPTION

Figure 1:
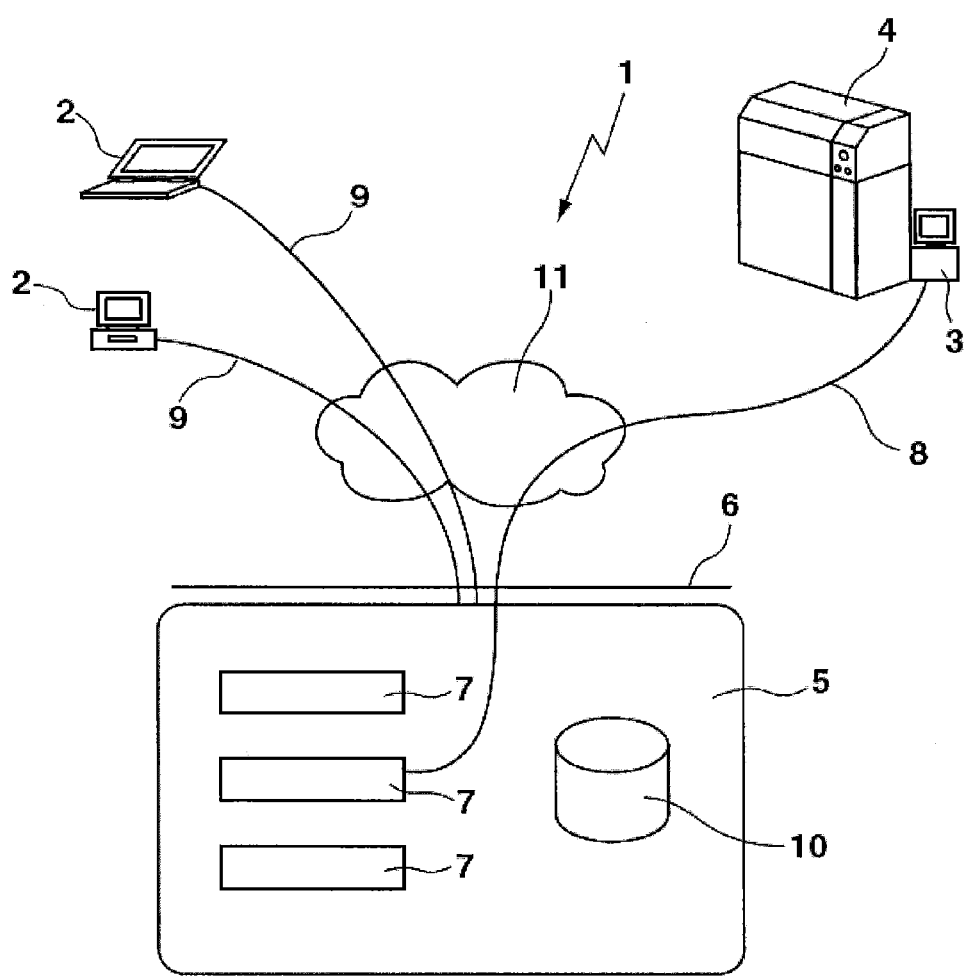
FIG. 1 shows a known remote communication system between a service computer and a machine control system by interposition of a central computer.
Figure 2:
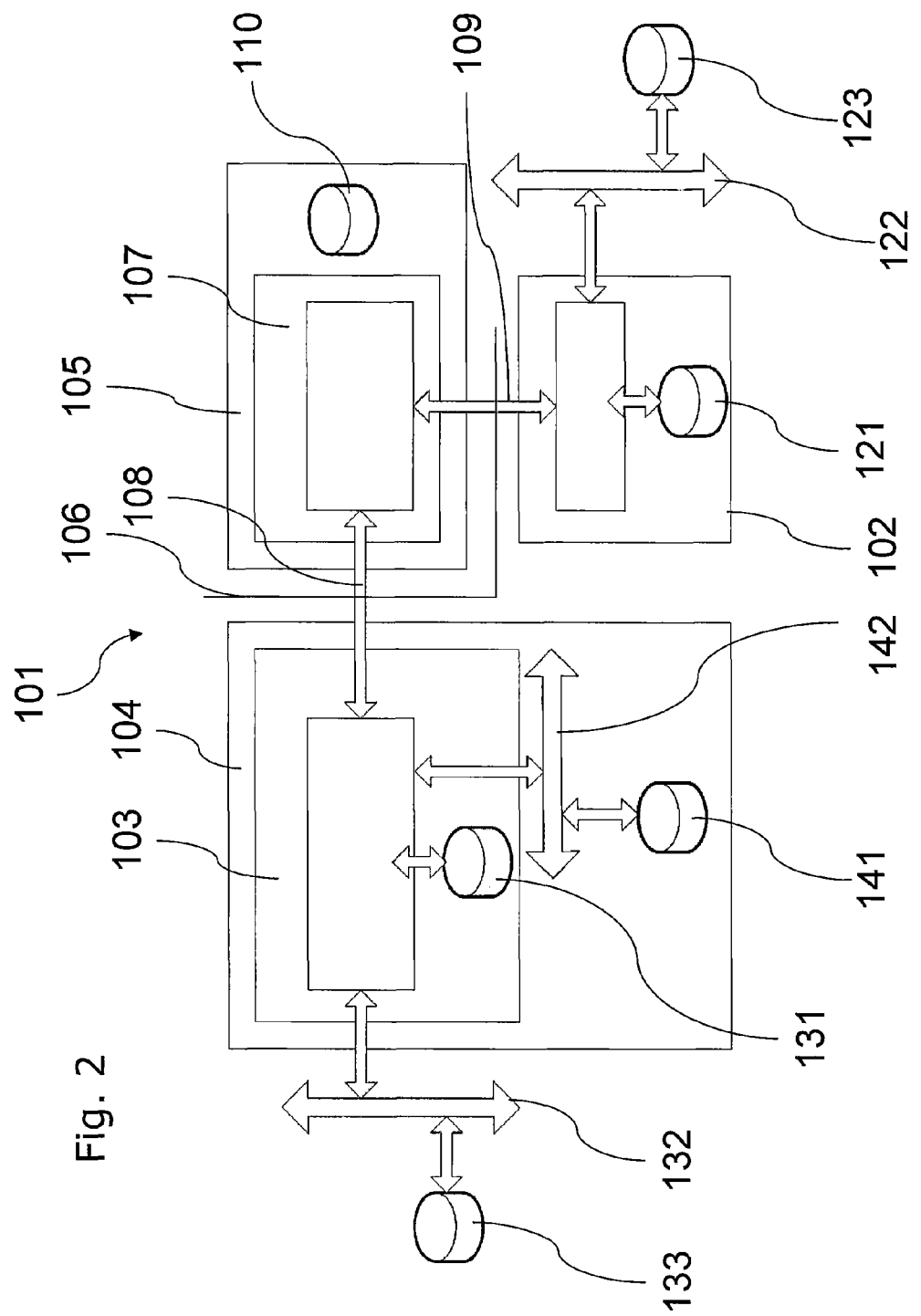
FIG. 2 discloses an embodiment of the system for file transmission according to the invention.

In FIG. 2, a system 101 for file transmission between a service computer 102 and a machine control system 103 of a machine 104 according to the invention is described.

The machine 104 is a machine tool or machining device, e.g. for laser machining, for punching or bending, and devices like e.g. laser beam sources, plasma generators or induction generators or another machine for manipulation of a work piece. The machine 104 comprises a data storage 131, which may be embodied as magnetic drive (HDD) or semiconductor drive (SSD). Files may be stored there readably and permanently. Further, the machine 104 comprises an internal machine communication network 142, via which control processes and data transmission is handled.

The machine control system 103 is an electronic data processing device, e.g. an industrial personal computer, by which the machine tool 104 may be programmed, operated and maintained, and that surveys operation of the machine tool. The machine control system 103 includes a data storage 131, e.g. a magnetic drive or a semiconductor drive, which can be accessed by the machine control system 103 to permanently store or read files. The machine control system 103 may access the data storage 141 via the machine communication network 142 to store or read files there. Further, the machine control system 103 is connected to a communication network 132, e.g. a communication network of the machine operator for company-internal data transmission and processing, based on Ethernet technology. Via the communication network 132, the machine control system 103 may access data storages 133 connected via the communication network 132. Those data storages may be part of file servers or NAS-systems, connected to the communication network 132 and allowing network access to data storages, e.g. via the "Server Message Block Protocol" (SMB-protocol) or the "Network File System Protocol" (NFS-protocol) or others. At the machine control system 103, software is installed, allowing file transmission with the remote computer. This software e.g. is the server part of PC-Anywhere File Transfer.

The service computer 102 is an electronic data processing device, e.g. a laptop that is usable for common data processing. The service computer 102 includes a data storage 121, e.g. a magnetic drive or a semiconductor drive, which the service computer 102 can access to permanently store or read files there. Further, the service computer 102 is connected to a communication network 122, e.g. a communication network of the machine manufacturer for company-internal data transmission and processing, based on Ethernet technology. Alternatively, the service computer 102 may be connected with a wide area network like the internet. Via the communication network 122 of the machine manufacturer, the service computer 102 may access data storages 123 connected via the communication network 122. Those data storages may be part of file server or NAS-systems, connected to the communication network 122, providing network access to data storages e.g. via the SMB-protocol or the NFS-protocol or others.

At the service computer 102, application software is in-stalled that can display the contents of desktops of remote computers via the Remote Desktop Protocol (RDP) and allows operation of the remote computer. A property of the Remote Desktop Protocol is that input and output operations to the data storage, to which the service computer 102 has access, may be redirected such that the remote computer may access the data storage in a manner, as if they were local data storage of the remote computer.

Here, not necessarily usage of the Remote Desktop Protocol is needed. Further protocols may be used that provide the same functionality, e.g. the "Independent Computing Architecture" (ICA), "Remote Frame Buffer" (RFB), or others. Protocols like that, allowing access to graphical user interfaces of operating systems or programs of remote computers are called "Remote Desktop Protocols" in the following. Remote Desktop Protocols are basically characterized by the fact that pixel information of an operating system or an application at a remote computer is transmitted in one direction to a user computer, and input information like mouse movements or keyboard inputs is transmitted from the user computer in the other direction to the remote computer.

The central computer 105 is an electronic data processing device, implementing a tele-present system. At the central computer 105, e.g. a "TRUMPF-Internet Telepräsenzportal" is installed. In such a system, at the central computer, a host operating system is installed. In the embodiment, this is a Linux-based operating system. Via a hypervisor, a specific kind of virtualization software, an environment for virtual machines is provided. In this embodiment, the hypervisor is VM-Ware of the manufacturer VMWare Inc. Alternatively, a so-called "bare metal hypervisor" may be used that is executable at the central computer without a basing complete host operating system.

At the hypervisor, one or plural virtual machines 107 may be operated in parallel. A virtual machine 107 is an environment, in which a guest operating system is provided with interfaces allowing the guest operating system to function as if it is installed at an own device and running without subjacent hypervisor. The central computer 105 comprises further a data storage 110 in form of a magnetic drive or a semiconductor drive. At the central computer, virtual machine templates 107' are stored (not shown in FIG. 2) that are adapted to the corresponding operating system and the corresponding application software of the machine control systems 103, respectively. The virtual machine template 107' is configured such that a virtual machine derived from that may be connected with the machine control system 103 via a first communication connection 108. The actual remote access to the machine control system 103 is carried out via a virtual machine 107 that is generated by copying the virtual machine template matching to the machine control system 103. In the embodiment, as a guest operating system, Microsoft Windows XP is used. Via the contained service "Terminal Services", this operating system provides the possibility to other computers, to access desktop, applications and data of the guest operating system via the Remote Desktop Protocol. Further, at the virtual machine, application software is installed, allowing file transmission between the virtual machine and a remote computer. In the embodiment, this application software for file transmission is PC-Anywhere File Transfer.

Between the virtual machine 107 and the machine control system 103, the first communication connection 108 may be established. In the embodiment, this connection is provided via the internet. For securing the first communication connection 108, this connection is carried out via an encrypted tunnel, and thus, a VPN connection is established.

Between the virtual machine 107 and the service computer 102, a second communication connection 109 is established. In the embodiment, this connection is carried out via an internal communication network of the machine manufacturer. The second communication connection 109 may also be established via the internet and may be secured via a VPN tunnel.

The first and the second communication connections 108, 109 from and to the central computer 102 are sealed off via a firewall 106 such that no direct connection between the service PC 102 and the machine control system 103 is possible. This means that at all layers of the ISO-OSI Reference Model, no direct protocol connection is possible between instances of those layers at the service computer 102 and the machine control system 103.

By means of the Remote Desktop Protocol, a connection with the virtual machine 107 is established via the second communication connection 109 such that the application software installed at the virtual machine 107 may be operated via the service computer 102. Further, the input/output operations to the data storages 121, 123 are such redirected—via RDP—to the virtual machine, that the data storages 121, 123 are embedded as own drives in the guest system of the virtual machine. A connection to the server component of the application software running at the machine control system 103 may be established via the communication connection 108 by means of the application software for file transmission installed at the virtual machine, and the data storages 131, 133, 141, to which the machine control system 103 has access can be accessed, and files may be exchanged between those data storages 131, 133, 141 and the data storages 121, 123, to which the service computer 102 has access.

Figure 3:
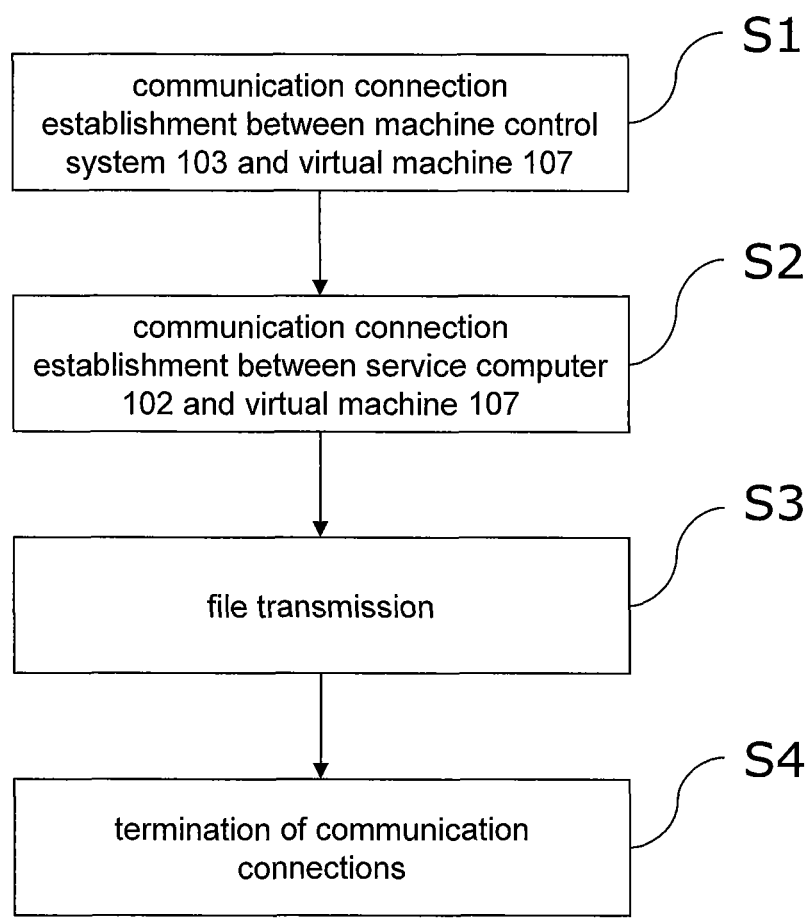
FIG. 3 shows a method according to the invention for file transmission between a machine control system and a service computer.

FIG. 3 shows a method for file transmission between the ma-chine control system 103 and the service computer 102 according to the invention.

In a first connection establishment step S1, a connection between the machine control system 103 and the virtual machine 107 is established. For that, at first, a copy of a suitable virtual machine template 107' is generated at the central computer 105, and based on that copy, the virtual machine 107 is started. After that, the first communication connection 108 is established between the virtual machine 107 and the machine control system 103 via the internet. For that, the first communication connection is secured via a VPN tunnel.

In a second connection establishment step S2, the second communication connection between the virtual machine 107 and the service computer 102 is established. In particular when the virtual machine 107 and the service computer 102 are not located in the same, protected network, this communication connection is secured via a VPN tunnel. The second communication connection may be established via an Ethernet-based internal communication network of the machine manufacturer as well as via the internet. The protocol RDP is used for establishment of the second communication connection. The second communication connection 109 is configured such that input/output operations to the data storages 121, 122, to which the ser-vice computer 102 has access, are redirected such that those data storages are embedded as drives at the virtual machine 107.

In a file transmission step S3, application software for file transmission is started at the virtual machine via the service computer 102 and the communication connection 109. A connection with the server component of this software at the machine control system 103 is established via the application software for file transmission. One or more files stored at the data storages 131, 132 or 141 are—by means of the application software for file transmission—selected, transmitted via the first communication connection 108 and stored at the data storages 121 or 123. In the same manner, it is possible to select and transmit via the first communication connection 108 and to store at the data storages 131, 133 and 141 one or more files stored at the data storages 121, 123.

In a termination step S5, the application software for file transmission is stopped, the first communication connection 108 and the second communication connection 109 are interrupted and the virtual machine 107 is erased. The erasure of the virtual machine 107 may occur automatically when neither the first communication connection 108 nor the second communication connection 109 are active anymore, or if one of both communication connections was not active via a selectable period of time.

The shown and described embodiment must not be understood as a concluding enumeration but rather is an example for describing the invention.

In this embodiment, the central computer is connected to the communication network of the machine manufacturer. The central computer also may be located at and operated by an external service provider.

Further, in the described embodiment, the file transmission is initiated by the service computer 102. In the same manner, it is possible that the file transmission is initiated by the machine control system 103. In that case, e.g. in an error case, the transmission of error protocol files to the data storages 121 and 123 may be initiated by the machine control system 103.

The sentential connectives "and", "or" and "either . . . or" are used in the meaning based on the logical conjunction, the logical disjunction (often "and/or") or the logical exclusive disjunction, respectively.

A number of embodiments of the invention have been described. Nevertheless, it will be understood that various modifications may be made without departing from the spirit and scope of the invention. Accordingly, other embodiments are within the scope of the following claims.

What is claimed is:

1. A system for file transmission between a service computer and a machine control system, comprising:
   at least one machine control system of a machine or a machine tool, having access to a first data storage, wherein the machine or the machine tool is controllable by the machine control system to manipulate a work piece;
   at least one service computer, having access to a second data storage, wherein the second data storage is different from the first data storage; and
   a central computer having at least one virtual machine, wherein the machine control system is operable to be connected to the virtual machine via a first communication connection in a manner that the virtual machine can transmit files with the machine control system via the first communication connection, and the machine control system has no direct access to the second data storage; and
   wherein the service computer is operable to be connected to the virtual machine via a second communication connection, in a manner that the virtual machine can access the second data storage, and the service computer has no direct access to the first data storage,
   wherein the virtual machine is configured to perform at least one of:
      reading files of a first transmission from the first data storage via the first communication connection and transmit the files of the first transmission via the second communication connection to the service computer that can store the files of the first transmission in the second data storage, or
      reading files of a second transmission from the second data storage via the second communication connection and transmit the files of the second transmission via the first communication connection to the machine control system that can store the files of the second transmission in the first data storage.

2. The system of claim 1, wherein, at all layers of the ISO-OSI Reference Model, no direct protocol connection is possible between instances of the layers at the service computer and the machine control system, such that no direct file transmission between the first data storage and the second data storage is possible.

3. The system of claim 1, wherein the first data storage is a data storage for permanently storing files, the first data storage being part of the machine control system or being accessible by the machine control system via a third communication connection different from the first and second communication connections, or
   the second data storage is a data storage for permanently storing files, the second data storage being part of the service computer or being accessible by the service computer via a fourth communication connection different from the first, second, and third communication connections.

4. The system of claim 1, wherein at least one of the first communication connection or the second communication connection is configured to be carried out via a Virtual Private Network (VPN) connection.

5. The system of claim 1, wherein the second communication connection is carried out via a Remote Desktop Protocol (RDP) where input/output operations to the second data storage are redirected such that the second data storage can be used like a local data storage in the virtual machine.

6. The system of claim 1, wherein the first communication connection is configured to be established via at least one application program comprised by the virtual machine.

7. The system of claim 1, wherein pixel information, mouse movements and keyboard movements are transmissible, and an application program is operable to run on the virtual machine via the second communication connection.

8. The system of claim 1, wherein the central computer, besides the at least one virtual machine, comprises at least one further virtual machine, wherein the virtual machines are configured for different kinds of the first communication connection and comprise different operating systems or different application programs or different virus protection programs.

9. The system of claim 1, wherein the central computer comprises a plurality of virtual machine templates that are designed for different kinds of machine control systems or first communication connections, and each virtual machine of the central computer is an executably embedded copy of the respective virtual machine template that is adapted to the corresponding machine control system or to the corresponding first communication connection.

10. A method for file transmission between a service computer and a machine control system, the method comprising:

establishing a first communication connection between at least one machine control system of a machine or a machine tool having access to a first data storage, and a virtual machine provided at a central computer, wherein the virtual machine is configured to transmit files with the machine control system via the first communication connection, wherein the service computer has no direct access to the first data storage, and wherein the machine or the machine tool is controllable by the machine control system to manipulate a work piece;

establishing a second communication connection between the virtual machine and a service computer having access to a second data storage, wherein the second data storage is different from the first data storage, and the machine control system has no direct access to the second data storage, and wherein the second communication connection is configured such that the virtual machine can access the second data storage to store and read files;

reading a file from one of the first data storage and the second data storage by the virtual machine via one of the first communication connection and the second communication connection;

transmitting the file to the other one of the first data storage and the second data storage by the virtual machine via the other one of the first communication connection and the second communication connection; and storing the file at the other one of the first data storage and the second data storage.

11. The method of claim 10, wherein via no protocol any direct communication connection or data transmission connection between the service computer and the machine control system is possible.

12. The method of claim 10, wherein at least one of the first communication connection or the second communication connection is carried out via a Virtual Private Network (VPN) connection.

13. The method of claim 10, wherein the establishing of the second communication connection comprises:

establishing the second communication connection by a Remote Desktop Protocol (RDP) where the second data storage is redirected such that the second data storage can be used like a local data storage in the virtual machine.

14. The method of claim 10, further comprising:

creating an executable copy of the virtual machine from one of a plurality of virtual machine templates, wherein the virtual machine template is adapted to the corresponding machine control system and the corresponding first communication connection; and providing a virtual machine based on the executable copy.

15. The method of claim 10, wherein the first data storage is included in the machine control system or connected to the machine control system via a third communication connection different from the first and second communication connections, and wherein the second data storage is included in the service computer or connected to the service computer via a fourth communication connection different from the first, second, and third communication connections.

16. The method of claim 10, further comprising:

starting application software for file transmission installed at the virtual machine via the service computer and the second communication connection; and establishing a connection to a server component of the application software running at the machine control system via the first communication connection by the application software for file transmission, wherein reading the file and transmitting the file comprises reading and transmitting the file by the application software for file transmission.

17. The method of claim 16, further comprising stopping the application software for file transmission to terminate the file transmission between the service computer and the machine control system.

18. The method of claim 17, further comprising:

interrupting at least one of the first communication connection or the second communication connection; and erasing the virtual machine at the central computer in response to at least one of:

neither the first communication connection nor the second communication connection being active, or at least one of the first communication connection or the second communication connection being inactive for a selectable period of time.

19. The method of claim 16, wherein the application software for file transmission comprises PC-Anywhere File Transfer.

20. The system of claim 1, further comprising application software for file transmission that is installed at the virtual machine and corresponds to a server component configured to run at the machine control system, wherein the application software for file transmission is configured to:

be started via the service computer and the second communication connection, establish a connection with the server component at the machine control system via the first communication connection, read and transmit files of a file transmission from one of the first data storage and the second data storage, and be stopped to terminate the file transmission between the service computer and the machine control system.

* * * * *